US007941859B2

(12) United States Patent
Camenisch et al.

(10) Patent No.: US 7,941,859 B2
(45) Date of Patent: May 10, 2011

(54) REDUCING ACCESS TO SENSITIVE INFORMATION

(75) Inventors: Jan L. Camenisch, Ruschlikon (CH);
Birgit M. Pfitzmann, Sametagern (CH);
Matthias Schunter, Zurich (CH);
Michael P. Waidner, Au (CH)

(73) Assignee: International Business Machines Corporation, Armonk, NY (US)

( * ) Notice: Subject to any disclaimer, the term of this patent is extended or adjusted under 35 U.S.C. 154(b) by 1115 days.

(21) Appl. No.: 10/874,421

(22) Filed: Jun. 23, 2004

(65) Prior Publication Data

US 2005/0289340 A1    Dec. 29, 2005

(51) Int. Cl.
*H04L 17/30* (2006.01)
*G06F 17/30* (2006.01)
*G06F 12/14* (2006.01)

(52) U.S. Cl. ............. 726/27; 726/2; 713/165; 713/166; 713/167; 713/193

(58) Field of Classification Search .................. 726/2–5, 726/26–27
See application file for complete search history.

(56) References Cited

U.S. PATENT DOCUMENTS

| | | | | |
|---|---|---|---|---|
| 5,867,821 | A * | 2/1999 | Ballantyne et al. | 705/2 |
| 6,275,824 | B1 * | 8/2001 | O'Flaherty et al. | 707/9 |
| 6,289,462 | B1 * | 9/2001 | McNabb et al. | 726/21 |
| 6,324,646 | B1 * | 11/2001 | Chen et al. | 726/6 |
| 6,957,229 | B1 * | 10/2005 | Dyor | 707/103 X |
| 2002/0116578 | A1 * | 8/2002 | Sakai et al. | 711/118 |
| 2003/0182435 | A1 * | 9/2003 | Redlich et al. | 709/229 |

OTHER PUBLICATIONS

Brahim Medjahed, Abdelmounaam Rezgui, Athman Bouguettaya and Mourad Ouzzani, Infrastructure for E-Government Web Services,IEEE Computer Society, 1089-7801/03/$17.00 2003, pp. 5865.*

* cited by examiner

*Primary Examiner* — Nasser Moazzami
*Assistant Examiner* — Fatoumata Traore
(74) *Attorney, Agent, or Firm* — Scully, Scott, Murphy & Presser, P.C.; Kenneth R. Corsello, Esq.

(57) ABSTRACT

Method, system, and storage medium for reducing or minimizing access to sensitive information. A method includes identifying processes and data associated with a computer system and classifying each of the data as one of either sensitive information or non-sensitive information. The sensitive information includes at least one of: data that is personal to an individual, confidential data, and data that is legally subject to conditions of restricted use. For each of the processes the method includes selecting a process and a sensitive data item, modifying the sensitive data item, analyzing the behavior of at least the selected process, and preventing access of the sensitive data item by the selected process if, as a result of the analyzing, the sensitive data item is determined not to be needed by the selected process.

23 Claims, 4 Drawing Sheets

REDUCING ACCESS TO SENSITIVE INFORMATION

FIELD OF THE INVENTION

The present invention relates generally to data processing, and more particularly, to a method, system, and storage medium for reducing or minimizing access to sensitive information used by business processes.

BACKGROUND OF THE INVENTION

Many organizations and enterprises use personal data in the engagement of standard business practices. For example, medical facilities maintain records for patients that include personal data such as name, address, and phone number. Also, these records may contain private or sensitive information about the medical history, diagnoses, and treatments relating to these patients. Additionally, sensitive information may also include a patient's financial account information used for billing practices.

Personal data used and maintained by businesses need to comply with privacy regulations, which typically demand that a process access personal information only if the information is needed for the purpose of performing that process and that the process itself is legitimate. In most any business, however, there are overlapping processes that use personal information, some of which may require use of the personal information and some that may not require personal information. In addition, it is often the case that collections or records of data comprise both personal and non-confidential data. As a result, it becomes burdensome to protect this sensitive information for enterprises and applications that track and control these processes and the type of data that they utilize.

What is needed, therefore, is a way to minimize the amount of personal or sensitive information that can be accessed by a process so that processes are limited to receiving only the sensitive information that they require.

BRIEF SUMMARY OF THE INVENTION

The above-stated disadvantages and shortcomings are overcome or alleviated by methods, systems, and storage medium for reducing or minimizing access to sensitive information used by business processes. A method provided includes identifying processes and data associated with a computer system and classifying each of the data as one of either sensitive information or non-sensitive information. The sensitive information includes at least one of: data that is personal to an individual, confidential data, and data that is legally subject to conditions of restricted use. For each of the processes the method includes selecting a process and a sensitive data item, modifying the sensitive data item, analyzing the behavior of at least the selected process, and preventing access of the sensitive data item by the selected process if, as a result of the analyzing, the sensitive data item is determined not to be needed by the selected process.

BRIEF DESCRIPTION OF THE DRAWINGS

These and other objects, features, and advantages of the present invention will become apparent upon further consideration of the following detailed description of the invention when read in conjunction with the drawing figures, in which.

DETAILED DESCRIPTION OF THE INVENTION

The present invention provides methods, systems, and storage medium for reducing or minimizing access to sensitive information used by processes. One method provided includes the steps of identifying processes and data associated with a computer system and classifying each of the data as one of either sensitive information or non-sensitive information. The sensitive information includes for example, data that is personal to an individual, and/or confidential data, and/or data that is legally or otherwise subject to conditions of restricted use. For each of the processes the method includes selecting a process and a sensitive data item, modifying the sensitive data item, analyzing the behavior of at least the selected process, and preventing access of the sensitive data item by the selected process if, as a result of the analyzing, the sensitive data item is determined not to be needed by the selected process.

Access minimization of the invention provides methods, systems, and storage medium for reducing or minimizing access to sensitive information used by business processes. An access minimization system minimizes access by transforming a process (e.g., 'P') into a process (e.g., '$P^1$') such that $P^1$ is limited to receiving less personal information than P when it has been determined that P does not require extensive personal information. The access minimization system may be applied to the analysis of existing processes as well as to the design of new processes as will be described further to FIG. 1.

Figure 2:
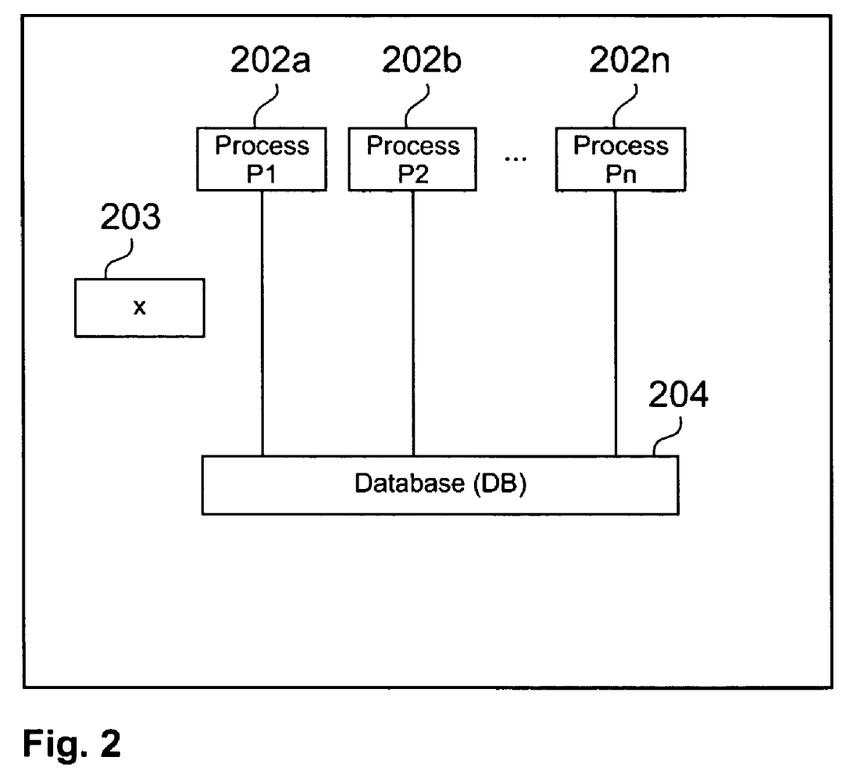
FIG. 2 is a block diagram of a prior art system that includes business processes that utilize both personal and non-confidential data.

The access minimization system may be implemented on any computer system and may be utilized for a large network system such as a local area network (LAN), wide area network (WAN), metropolitan area network (MAN), and other suitable network systems. A computer network system, prior to implementation of the access minimization system, is shown in FIG. 2. FIG. 2 illustrates a computer network system 200 that includes a variety of processes 202a-202n, in communication with a database 204. Processes 202a-202n may comprise a software application or a set of operations or instructions within an application. Further, processes 202a-202n need not be resident within a single computer system, but may be executing on one or more processors located in separate computers and/or separate networks.

Database 204 resides in a storage repository that is addressable by one or more of processes 202a-202n. While only a single database 204 is shown, it will be understood by those skilled in the art that any number of databases may be present and utilized by the access minimization system. As shown in FIG. 2, when a process requires access to a data value 203 (e.g., 'x'), it directly accesses the database to retrieve the data value. As indicated above, one of the problems with using the current network system configuration is that processes may have unrestricted access, or greater access than is necessary, to information that exposes the network system to potential breaches of privacy regulations.

Figure 3:
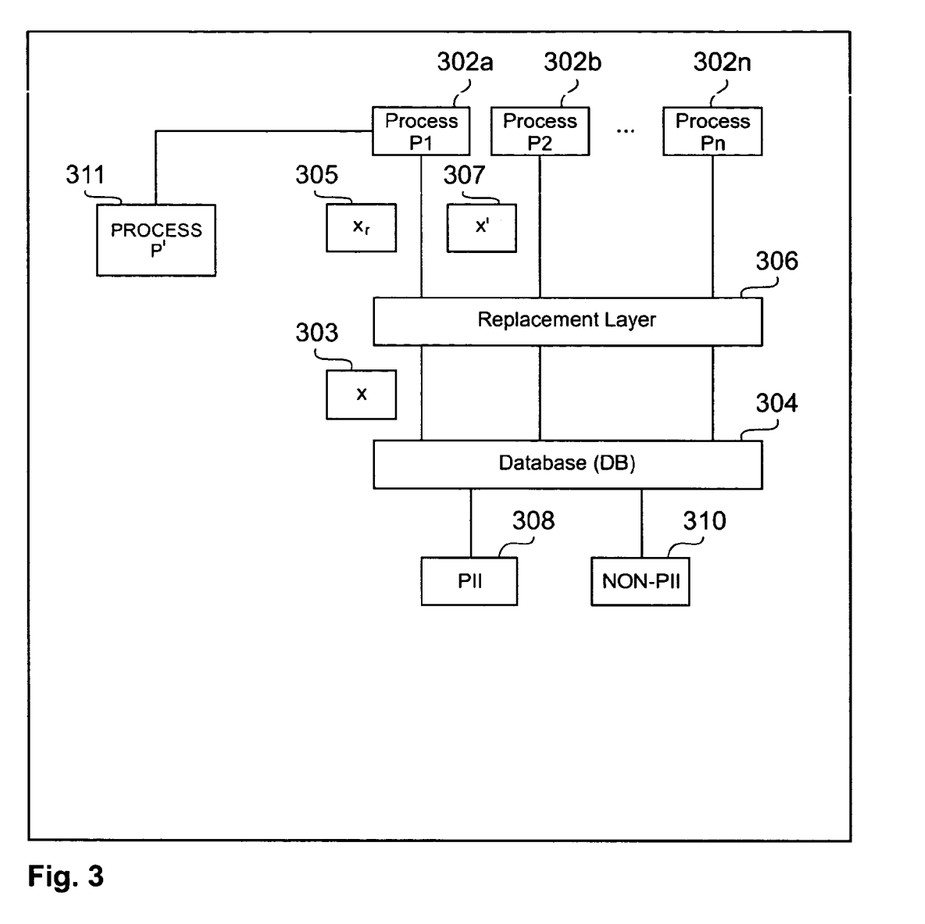
FIG. 3 is a block diagram of an example of a layered system including a sample replacement layer.
Figure 4:
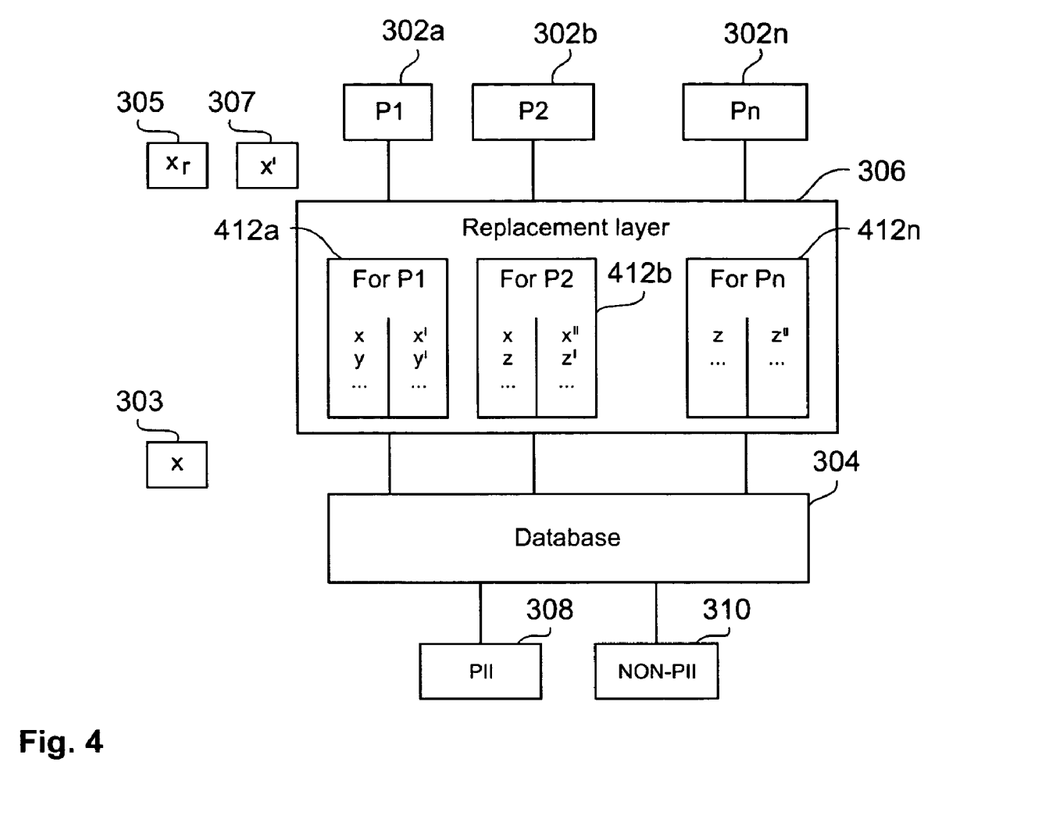
FIG. 4 is a block diagram of an example of a layered system including a sample replacement layer with tables created for processes that are utilized by the access minimization system.

FIGS. 3 and 4 illustrate a system 300 modified by the access minimization system upon implementation. FIGS. 3 and 4 will be described further herein in context with the method of FIG. 1 as embodiments. At step 102, all processes 302a-302n and data in database 304 are identified. Database 304 may store image files, text files, multimedia, and other suitable media. The data and activities may be categorized according to trust domains. A process may include a set of all related activities in the same trust domain. Trust domains refer to the type of access required for a user, as well as the level of access needed by the user. For example, in a medical facility, a type of access required for an administrative clerk may include access to a billing application. However, the level of access required for this clerk may be limited to printing patient bills but not access to creating or editing bills. Likewise, a clerk may have limited access to databases of patient information. If there are known inclusion relationships among individuals with control over certain processes, these relationships are noted as well.

Figure 1:
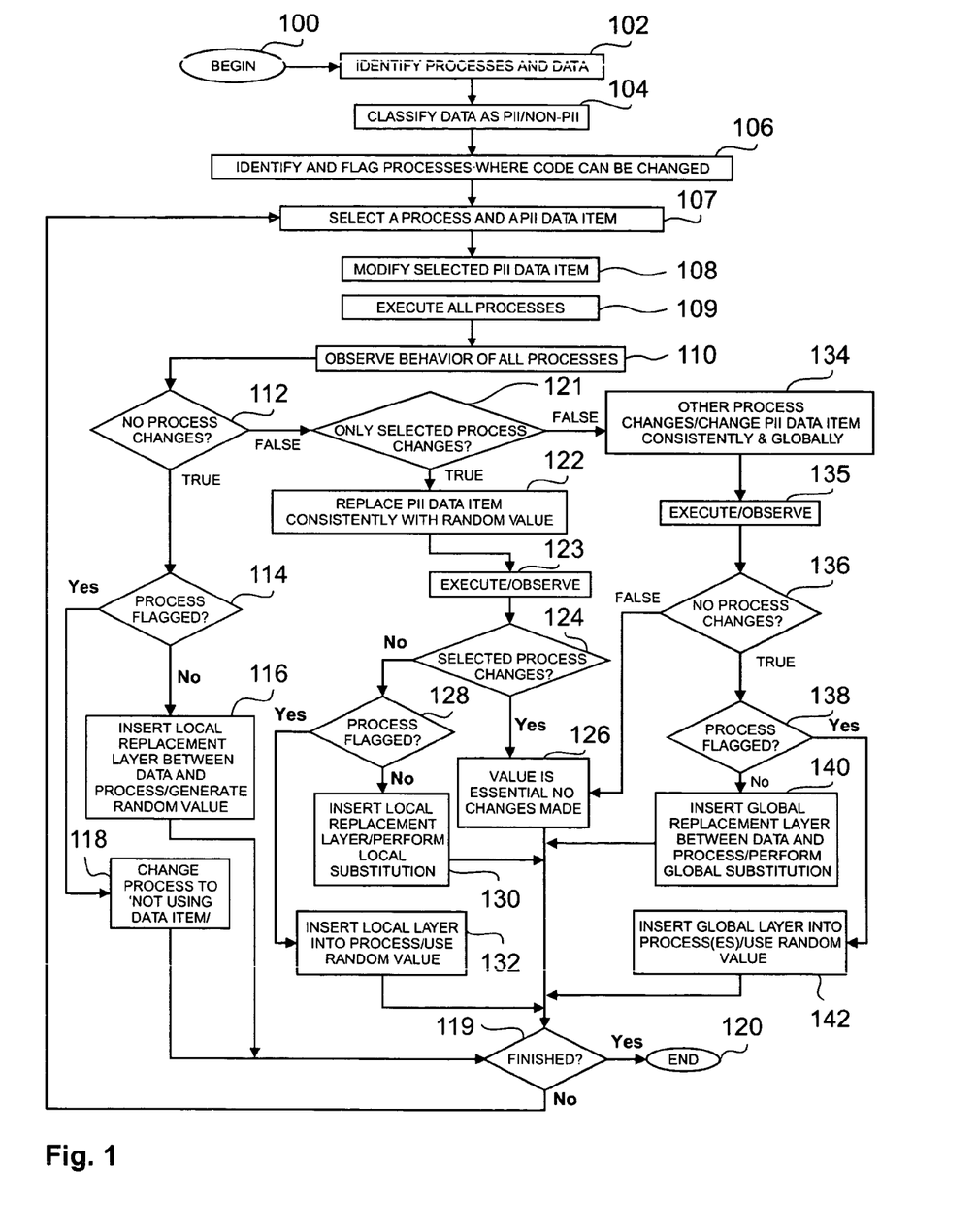
FIG. 1 represents a flowchart that describes an example of a process for implementing an access minimization system.

At step 104, all of the data in database 304 are classified as being either personally identifiable information (PII) 308 or non-personally-identifiable information (non-PII) 310. Personally identifiable information is also referred to herein as 'sensitive information.' Personally identifiable information, or sensitive information, refers to any personal data associated with an individual or subject matter that is considered to be private or confidential and which may be subject to privacy regulations or other restrictive use conditions. If the associated processes include network protocols, the data under consideration should include network addresses and authentication information, and the processes to exchange this information. The units in which PII is considered should be the minimum sensible ones, even if the current process model uses larger units. For example, if there is currently a notion of 'address' that includes both a street address and telephone number, the street address and phone number should be considered separately. Moreover, a town and street should also be separated in the event some processes require the town but not the street (e.g., for statistical purposes).

At step 106, it is determined which processes 302a-302n, if any, have changeable code and whether the organizational capabilities exist to realize secure modules, (i.e., processes with an empty control group so that they may receive all PII). For those processes that have changeable code, these processes are flagged as such at step 106. This information is used later in steps 118, 132, and 142 as described further herein.

A black-box analysis is performed and a layer 306 inserted between processes 302a-302n and the data in database 304 as detailed in method steps provided herein. Alternatively, a source code analysis may be performed here if applicable. If source code or a detailed information-flow design of a process 'P' is available, then standard information-flow techniques (e.g., static program analysis) may be used to define which inputs to P (including inputs read from a database or other data repository, user inputs, network inputs, and inputs from other processes) influence the observable behavior of the process (e.g., outputs to databases, users, the network, actuators, and other processes). Once the analysis has been completed, it is known which data the processes need and which data may be changed.

The layer 306 occurs as each process 302a-302n is insulated from the data in database 304. The layer 306 substitutes each data item 'x' (e.g., 303) that a process requests by a random data item '$x^1$' (e.g., 307) in a one-to-one-mapping process, such that when the process later asks for the same data item 303, the same substitution (e.g., 307) is made. When the process writes back to the database, the substitution is then undone. By replacing only one kind of data item at a time, each process' access to the databases (and messages sent between data users of different trust domains) can be monitored and observed. This process is described further herein.

The remaining steps presented in FIG. 1 (i.e., 107-142) are repeated for each PII data item and each process (302a-302n). At step 107, a PII data item (e.g., 303) and process (e.g., 302a) are selected. The access minimization system modifies the selected PII data item 303 at step 108. For example, the PII data item 303 may be replaced with a random-generated data value (e.g., 305) that is supplied in the same format as the selected data item 303. For example, if data item 303 is a date, then a random number 305 would be generated and provided in 'date' form. A random-generated data item 305 is also referred to herein as a 'modified data item' and is distinguishable from data item 307 as will be described further herein.

At step 109, all processes: (e.g., 302a-302n) within the system are executed whereby the selected process 302a is fed the modified data item 305. The modified data item 305, is newly-generated each time the selected process 302a accesses the selected data item 303. However, the remaining processes 302b-302n will continue to be fed the selected data item 303 (also referred to herein as 'unmodified' data item.

The resulting behaviors of these executed processes 302a-302n, if any, are then observed at step 110. Three possible scenarios exist as a result of this execution: the execution of the selected process 302a does not affect any processes 302b-302n, the selected process 302a only is affected, or at least one other process 302b-302n is affected (i.e., the process has changed as a result of the execution). In order to validate the observations made, it may be desirable to repeat steps 108-110.

If no other processes (including the selected process) behave differently as a result of this execution at step 112, this indicates that the PII data item 303 related to the executed process 302a is not required by the selected process 302a; although one or more of other processes 302b-302n may need this data item 303. The access minimization system prevents the selected process 302a from accessing the actual value of the PII data item 303 by either changing the process 302a or changing the value of the data item 303. The method used to prevent this access depends upon whether the process code of process 302a is changeable as indicated by a flag. If the process 302a is not flagged at step 114 (indicating that the process code is not changeable), the access minimization system inserts a local replacement layer 306 and generates a random value each time the data item 303 is accessed by the selected process (e.g., data item 303 as 'x' to data item 305 as $x_r$). If the selected process write data back to database 304, then tables created for each of processes 302a-302n within replacement layer 306 may be used for this purpose as shown in FIG. 4 in tables 412a-412n.

If the process 302a is flagged at step 114, then the access minimization system changes the process code (e.g., P 302a to $P^1$ 311) so that the process 302a will not use the data item 303 at step 118. At step 119, it is determined if there are any additional processes and data items for selection. If not, the method ends at step 120. Otherwise, the method returns to step 107.

Referring back to step 112, if modification of the data item 303 and execution of the all processes 302a-302n result in a process change, it is determined whether only the selected process 302a has been affected, or whether other processes 302b-302n have been affected. At step 121, if only the selected process 302a has been affected, then the access minimization system replaces the selected data item 303 with a random-generated value (e.g., data item x 303 to data item 307 $x^1$) consistently and locally at each occurrence during the execution at step 122 (i.e., the selected process 302a is fed the same random-generated data value 307 whenever it accesses the selected data item 303). Data value 307 is distinguishable from the modified data value 305 used in step 108 above in that, unlike the data value 307, modified data value 305 is newly-generated at each time the selected data item 303 is accessed by the selected process.

The selected process 302a is executed and observations are made of the results of the execution at step 123. As a result of the observation, it is determined whether the behavior of the selected process 302a changed at step 124. If the behavior of the selected process 302a changed at step 124, this means that the value of the PII data item 303 is essential to the selected process 302a. Therefore, no change is made to the data item 303 or the process 303a and the method proceeds to step 119 as described above at step 126.

If the behavior of the selected process 302a is not changed as a result of the execution at step 124, it is then determined whether the process 302a is flagged at step 128. If not, this means that the process code is not changeable. The access minimization system then inserts a local replacement layer 306 between the value of the data item (e.g., 303) and the selected process 302a and performs a local substitution of the data item value (e.g., data item x 303 is changed to data item $x^1$ 307) at step 130. This is done using a reversible randomizing substitution function so that whenever the substituted data item 307 is returned to the replacement layer 306, the substitution is undone before storing the original data item 303 in database 304. This is shown in FIGS. 3 and 4. In this manner, the actual value of the data item 303 is not used during execution of the process 302a and the method continues at step 119.

If the process 302a has been flagged at step 128, the access minimization system adapts the process code (e.g., P 302a changed to P' 311) by inserting a local layer 306 into the process itself so that the selected process 302a will use a random value 307 in place of the actual value of the data item 303 for each future access at step 132 (e.g., a random 9-digit number generated as a substitute for a person's social security number). The method continues at step 119.

Referring back to step 110, if both steps 112 and 121 are false, then the method continues at step 134 indicating that one or more processes have changed. The access minimization system changes the selected data item 303 consistently and globally whereby the relevant process(es) are fed the same random data value 307 for each access. The affected process(es) are then executed at step 135 and the resulting behaviors, if any, are observed. At step 136, it is determined whether any process(es) have changed as a result of this execution. If so, this means that the value of the data item 303 is essential to the process(es). Therefore, the access minimization system does not make any changes to the process(es) or the data item at step 126 and the method continues at step 119.

If the behavior of none of the selected process(es) changes at step 136, it is then determined whether the process(es) have been flagged at step 138, similar to step 128. If the process(es) have not been flagged, the access minimization system inserts a global replacement layer 306 between the selected process (es) and the data item and performs a global substitution of the value of the data item at step 140. By performing a global substitution, a single replacement table such as 412a may be shared by all identified processes in step 140. Using a local substitution as described in step 130, an unaffected process (e.g., 302b) may be granted access only to table 412b.

If the process(es) have been flagged at step 138, the access minimization system changes the process code (e.g., P 302a changed to P' 311) by inserting a global layer 306 into the selected process(es) so that the data item 303 will not be used by the process(es) at step 142, but rather a random value 307 is used, and the method continues in step 119.

The access minimization system works with any method for determining whether a process' behavior depends on 'x' or not (e.g., static program analysis). The mapping from x to $x^1$ can be done by tables (e.g., 412a-412n) that map x to random $x^1$, or by some algorithmic function like encrypting x under a secret key not known to the process P, or by any other means that ensures that x cannot be determined from $x^1$, and that allows $x^1$ to be mapped back to the original x. Whether (P,x) meet this condition can be determined through static analysis. For efficiency, the re-transformation of $x^1$ to x may be omitted if the output of P is only used by other processes in the same way, and defer the re-transformation until some process actually does something with these data.

In an alternative embodiment, if the process code is changeable and a process obtains x from process 302a and passes it on to process 302n, then process 302n may obtain x directly from database 304. If a process obtains x directly from the user and passes it to process 302n, then process 302n may access x directly from the user if process 302n has a direct user interface.

In a further embodiment, the access minimization system may be extended to shift the process borders (e.g., process functions) in a larger way (e.g., if x is only used in a small way 'p_i' of 'P_I', and is used otherwise in 'P_j', and all data needed by p_i from P_I are shifted into P_j).

In yet further embodiments, the access minimization system may be extended by systematic handling of consent collection: one first identifies which process P needs consent for which processing of which data items x. Then, this consent is collected by processing those control groups that are subsets of P's. If this is not possible, and auditing is desired, special logging of why P believed in the consent is necessary. Further, if the number of consents a user has to give is large, one may first summarize the consents that are needed for exactly the same actions. Further, one may summarize related actions and join the consent for them judicially.

In general, the access minimization system as described above may delegate some operations to database 304. For example, processes such as process 302b may not receive any information back from such a request (e.g., increasing a transaction counter for an account can be done without knowing the value of that counter, thus process 302a might receive the right to increase the counter without receiving the right to read the counter), in some cases it may receive just one bit (e.g., whether this counter is below some threshold). In some cases, however, process 302a may really require the actual data item value (e.g., an application that is used to analyze x-rays probably needs full access to these x-rays, and cannot delegate all operations to the database 304).

As described above, the access minimization system provides a way to reduce or minimize access to sensitive information used by business processes. The access minimization system reduces or minimizes access by transforming a process (e.g., 'P') into a process (e.g., 'P¹') such that $P^1$ uses less personal information than P. The access minimization system may be applied to the analysis of existing processes as well as to the design of new processes.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system —or other apparatus adapted for carrying out the methods and/or functions described herein —is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which —when loaded in a computer system —is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A method for reducing access to sensitive information, comprising:
    identifying processes and data associated with a computer system;
    classifying each of said data as one of sensitive information and non-sensitive information;
        wherein said sensitive information includes at least one of:
            data that is personal to an individual;
            confidential data; and
            data that is subject to conditions of restricted use;
    for each of said processes:
        selecting a process and a sensitive data item;
        modifying said sensitive data item to form a modified data item each time the selected process accesses the sensitive data;
        analyzing behavior of at least said selected process;
    preventing access to said sensitive data item by said selected process if, as a result of said analyzing, said sensitive data item is determined not to be needed by said selected process, wherein said preventing access includes substituting a value of said sensitive data item with an alternate data value whenever said selected process requests access to said sensitive data item, and wherein if said selected process does not have changeable code, said substituting a value of said sensitive data item with an alternate data value is performed by inserting a replacement layer between said sensitive data item and said selected process,
    wherein said substituting a value of said sensitive date item is performed by:
        randomly generating said alternate data value;
        mapping said alternate data value to said sensitive data item; and
        storing mapped alternate data value and corresponding sensitive data item in a table within said replacement layer, said table being accessible to said
    selected process; and
    minimizing access to sensitive information by transforming a process P into a process P' such that P' is limited to receiving less personal information than P when it has been determined that P does not require extensive personal information.

2. The method of claim 1, wherein said substituting a value of said sensitive data item with an alternate data value is performed by:
   generating an alternate data value; and modifying code of said selected process operable for directing said selected process to access said alternate data value in place of said sensitive data item.

3. The method of claim 2, wherein if said selected process has changeable code, said substituting a value of said sensitive data item with an alternate data value is performed by inserting a replacement layer into said selected process.

4. The method of claim 1, wherein said replacement layer is local to said selected process if said sensitive data item is not needed by said selected process, said local replacement layer being operable for preventing said selected process from accessing said sensitive data item.

5. The method of claim 1, wherein said replacement layer is global to said selected process and at least one other of said processes if said sensitive data item is not needed by said selected process and at least one other of said processes, said global replacement layer being operable for permitting said selected process and said at least one other of said processes to access said sensitive data item.

6. The method of claim 1, wherein said analyzing is performed using static analysis.

7. The method of claim 1, wherein said analyzing is performed by executing said processes.

8. The method of claim 1, further comprising reversing said substituting a value of said sensitive data item when said selected process has completed, said reversing being operable for returning said sensitive data item from said replacement layer to a database.

9. The method of claim 1, wherein said substituting is performed using encryption; wherein said sensitive data item is encrypted to a key that is not available to said selected process.

10. The method of claim 1, wherein the step of analyzing behavior of at least said selected process includes:
   executing all of said processes, said selected process accessing said modified data item in its execution; and
   determining one or more of the said processes that are affected during the executing of all of said processes.

11. The method of claim 1, wherein the alternate data value does not change each time the selected process requests access to the sensitive data item.

12. A method for reducing access to sensitive information, comprising:
   identifying processes and data associated with a computer system;
   classifying each of said data as one of sensitive information and non-sensitive information;
      wherein said sensitive information includes at least one of:
         data that is personal to an individual;
         confidential data; and
         data that is subject to conditions of restricted use;
      for each of said processes:
         selecting a process and a sensitive data item;
         modifying said sensitive data item to form a modified data item each time the selected process accesses the sensitive data;
         analyzing behavior of at least said selected process;
         preventing access to said sensitive data item by said selected process if, as a result of said analyzing, said sensitive data item is determined not to be needed by said selected process, wherein said preventing access includes substituting a value of said sensitive data item with an alternate data value whenever said selected process requests access to said sensitive data item and wherein if said selected process does not have changeable code, said substituting a value of said sensitive data item with an alternate data value is performed by inserting a replacement layer between said sensitive data item and said selected process,
      wherein said substituting a value of said sensitive date item is performed by:
         randomly generating said alternate data value;
         mapping said alternate data value to said sensitive data item; and
         storing mapped alternate data value and corresponding sensitive data item in a table within said replacement layer, said table being accessible to said selected process;
   shifting a function of a first selected process associated with said sensitive data item to a second selected process if, as a result of said analyzing, it is determined that said second selected process utilizes said sensitive data item more frequently than said first selected process; and
   minimizing access to sensitive information by transforming a process P into a process P' such that P' is limited to receiving less personal information than P when it has been determined that P does not require extensive personal information.

13. A computer system for reducing access to sensitive information, comprising
   a processor;
   a plurality of processes executable by said computer system;
   a database storing data items utilized by said at least one process;
   a replacement layer in communication with said at least one of said plurality of processes, said replacement layer operable for controlling access to said data items; and
   an access minimization system associated with said computer system, said access minimization system performing:
   identifying said plurality of processes and said data items associated with said computer system;
   classifying each of said data items as one of sensitive information and non-sensitive information;
   for each of said processes:
      selecting a process and a sensitive data item;
      modifying said sensitive data item;
      analyzing behavior of at least said selected process; and
         preventing access of said sensitive data item by said selected process if, as a result of said analyzing, said sensitive data item is determined not to be needed by said selected process, wherein said preventing access includes substituting a value of said sensitive data item with an alternate data value whenever said selected process requests access to said sensitive data item, and wherein if said selected process does not have changeable code, said substituting a value of said sensitive data item with an alternate data value is performed by inserting a replacement layer between said sensitive data item and said selected process,
   wherein said substituting a value of said sensitive date item is performed by:
      randomly generating said alternate data value;
      mapping said alternate data value to said sensitive data item; and storing mapped alternate data value and corresponding sensitive data item in a table within said replacement layer, said table being accessible to said selected process; and minimizing access to sensitive information by transforming a process P into a process P' such that P' is limited to receiving less personal information than P when it has been determined that P does not require extensive personal information.

14. The computer system of claim 13, wherein said sensitive information includes at least one of:
    data that is personal to an individual;
    confidential data; and
    data that is legally subject to conditions of restricted use.

15. The computer system of claim 13, wherein said substituting a value of said sensitive data item with an alternate data value is performed by: generating an alternate data value; and modifying code of said selected process operable for directing said selected process to access said alternate data value in place of said sensitive data item.

16. The computer system of claim 15, wherein if said selected process has changeable code, said substituting a value of said sensitive data item with an alternate data value is performed by inserting a replacement layer into said selected process.

17. The computer system of claim 13, wherein said replacement layer is local to said selected process if said sensitive data item is not needed by said selected process, said local replacement layer being operable for preventing said selected-process from accessing said sensitive data item.

18. The computer system of claim 13, wherein said replacement layer is global to said selected process and at least one other of said processes, and if said sensitive data item is not needed by said selected process and at least one other of said processes, said global replacement layer being operable for permitting said selected process and said at least one other of said processes to access said sensitive data item.

19. The computer system of claim 13, wherein said analyzing is performed using static analysis.

20. The computer system of claim 13, wherein said analyzing is performed by executing said processes.

21. The computer system of claim 13, further comprising reversing said substituting a value of said sensitive data item when said selected process has completed, said reversing being operable for returning said sensitive data item from said replacement layer to a database.

22. The computer system of claim 13, wherein said substituting is performed using encryption; wherein said sensitive data item is encrypted to a key that is not available to said selected process.

23. A non-transitory computer readable storage medium storing machine-readable computer program code for reducing access to sensitive information, said storage medium including instructions for causing a computer system to implement a method, comprising:
    identifying processes and data associated with a computer system;
    classifying each of said data as one of sensitive information and non-sensitive information;
    wherein said sensitive information includes at least one of:
        data that is personal to an individual;
        confidential data; and
        data that is legally subject to conditions of restricted use;
        for each of said processes:
        selecting said process and a sensitive data item;
        modifying said sensitive data item;
        analyzing behavior of at least said selected process; and preventing access of said sensitive data item by said selected process if, as a result of said analyzing, said sensitive data item is determined not to be needed by said selected process, wherein said preventing access includes substituting a value of said sensitive data item with an alternate data value whenever said selected process requests access to said sensitive data item, and wherein if said selected process does not have changeable code, said substituting a value of said sensitive data item with an alternate data value is performed by inserting a replacement layer between said sensitive data item and said selected process,
    wherein said substituting a value of said sensitive date item is performed by:
        randomly generating said alternate data value;
        mapping said alternate data value to said sensitive data item; and
        storing mapped alternate data value and corresponding sensitive data item in a table within said replacement layer, said table being accessible to said selected process; and
    minimizing access to sensitive information by transforming a process P into a process P' such that P' is limited to receiving less personal information than P when it has been determined that P does not require extensive personal information.

* * * * *